(12) United States Patent
Wilkinson et al.

(10) Patent No.: US 6,682,839 B2
(45) Date of Patent: Jan. 27, 2004

(54) METHOD AND APPARATUS FOR CONTROLLING THE TEMPERATURE WITHIN AN ELECTROCHEMICAL FUEL CELL

(75) Inventors: David P. Wilkinson, North Vancouver (CA); Bien Hung Chiem, Burnaby (CA); Joy A. Roberts, Coquitlam (CA); Jean St-Pierre, Vancouver (CA); Jürgen Stumper, Vancouver (CA); Joerg Zimmermann, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 209 days.

(21) Appl. No.: 09/848,531

(22) Filed: May 3, 2001

(65) Prior Publication Data

US 2002/0006534 A1 Jan. 17, 2002

Related U.S. Application Data

(63) Continuation of application No. 09/203,128, filed on Dec. 1, 1998, now abandoned.

(51) Int. Cl.⁷ .................. H01M 8/04; H01M 08/12; H01M 8/10
(52) U.S. Cl. .............. 429/24; 429/22; 429/26; 429/30
(58) Field of Search .................. 429/29, 26, 30, 429/22

(56) References Cited

U.S. PATENT DOCUMENTS

| | | | |
|---|---|---|---|
| 3,964,930 A | 6/1976 | Reiser | 136/86 |
| 5,185,218 A | 2/1993 | Brokman et al. | 429/27 |
| 5,200,278 A | 4/1993 | Watkins et al. | 429/24 |
| 5,206,094 A | 4/1993 | Katz | 429/26 |
| 5,230,966 A | 7/1993 | Voss et al. | 429/26 |
| 5,344,721 A | 9/1994 | Sonai et al. | 429/20 |
| 5,366,821 A | 11/1994 | Merritt et al. | 429/21 |
| 5,397,491 A | 3/1995 | Hons et al. | 252/73 |
| 5,484,666 A | 1/1996 | Gibb et al. | 429/34 |
| 5,514,487 A | 5/1996 | Washington et al. | 429/39 |
| 5,958,613 A | 9/1999 | Hamada et al. | 429/26 |

FOREIGN PATENT DOCUMENTS

| | | |
|---|---|---|
| DE | 197 41 331 | 4/1999 |
| DE | 198 02 038 | 7/1999 |
| DE | 198 02 490 | 7/1999 |
| EP | 0 743 693 A1 | 11/1996 |
| EP | 0 851 519 A1 | 7/1998 |
| JP | 62-066581 | 3/1987 |
| JP | 63-232273 | 9/1988 |
| WO | WO 99/60633 | 11/1999 |

OTHER PUBLICATIONS

Holeschovsky et al., "Flooded flow fuel cells : a different approach to fuel cell design," *Journal of Power Sources*, 63:63–69 (1996).

Primary Examiner—Stephen Kalafut
Assistant Examiner—Julian Mercado
(74) Attorney, Agent, or Firm—McAndrews, Held & Malloy, Ltd.

(57) ABSTRACT

A method of controlling the temperature within an electrochemical fuel cell stack comprises introducing a reactant fluid stream comprising both a heat transfer liquid and a reactant into a fuel cell assembly such that the reactant fluid stream contacts an electrode. The heat transfer liquid is other than water. Preferably, the method further comprises recirculating heat transfer liquid which is in the reactant exhaust stream, typically via a heat exchanger, and re-introducing it into the fuel cell assembly in the reactant fluid stream. The recirculated heat transfer liquid may be directed to a reservoir which in turn supplies heat transfer liquid to the reactant fluid stream as it is needed. In a further embodiment, the method may comprise using the heat transfer liquid to heat a fuel cell stack to a desired operating temperature rather than cooling the stack.

45 Claims, 11 Drawing Sheets

METHOD AND APPARATUS FOR CONTROLLING THE TEMPERATURE WITHIN AN ELECTROCHEMICAL FUEL CELL

CROSS-REFERENCE TO RELATED APPLICATION

This application is a continuation of U.S. patent application Ser. No. 09/203,128 filed Dec. 1, 1998, now abandoned, entitled "Method and Apparatus for Controlling the Temperature Within an Electrochemical Fuel Cell". The '128 application is incorporated by reference herein in its entirety.

FIELD OF THE INVENTION

The present invention relates to electrochemical fuel cells. In particular, the invention provides a method and apparatus for controlling the temperature within a fuel cell using a heat transfer liquid travelling in the same fluid passages as a reactant fluid.

BACKGROUND OF THE INVENTION

Electrochemical fuel cells convert reactants, namely fuel and oxidant fluids, to generate electric power and reaction products. Electrochemical fuel cells employ an electrolyte disposed between two electrodes, namely a cathode and an anode. The electrodes each comprise a quantity of electrocatalyst disposed at the interface between the electrolyte and the electrodes to induce the desired electrochemical reactions. The location of the electrocatalyst generally defines the electrochemically active area of the fuel cell.

Solid polymer fuel cells generally employ a membrane electrode assembly ("MEA") which typically consists of a solid polymer electrolyte, or ion exchange membrane, disposed between two electrode layers comprising porous, electrically conductive sheet material. The membrane is typically proton conductive, and acts as a barrier for isolating the fuel and oxidant streams from each other on opposite sides of each MEA. The membrane also substantially electronically insulates the electrodes from each other.

In a fuel cell stack, the MEA is typically interposed between two separator plates that are substantially impermeable to the reactant fluids. The plates act as current collectors and provide support for the adjacent electrodes. To distribute the reactant fluids to the respective electrochemically active area of each electrode, the reactant fluid passages may comprise open-faced channels or grooves formed in the surfaces of the plates that face the MEA. Such channels or grooves define a flow field area that generally corresponds to the adjacent electrochemically active area. Such separator plates, which have reactant channels formed therein are commonly known as flow field plates. The flow field plates, together with the porous electrode layer define reactant fluid passages adjacent both sides of each membrane.

In a fuel cell stack a plurality of fuel cells is connected together, typically in series, to increase the overall output power of the assembly. In such an arrangement, one side of a given plate may serve as an anode plate for one cell and the other side of the plate may serve as the cathode plate for the adjacent cell. To improve the viability of fuel cells as a commercial power source, it is generally desirable to improve the power density of the stack, that is, to reduce the stack dimensions and weight for a given electrical power output capability.

The fuel fluid stream which is supplied to the anode may be a gas such as substantially pure hydrogen or a reformate stream comprising hydrogen. Alternatively, a liquid fuel stream such as, for example, aqueous methanol may be used. The oxidant fluid stream, which is supplied to the cathode, typically comprises oxygen, such as substantially pure oxygen, or a dilute oxygen stream such as air. In a fuel cell stack, the fuel and oxidant fluid streams are typically supplied to respective electrodes by respective supply manifolds and exhausted from the same electrodes by respective exhaust manifolds. Manifold ports fluidly connect the stack manifolds to the flow field area and the electrochemically active area of each fuel cell. (See U.S. Pat. Nos. 5,484,666 and 5,514,487, each of which is hereby incorporated by reference in its entirety, and which disclose examples of fuel cell stack manifold configurations.)

In conventional solid polymer fuel cells incorporating an ion exchange membrane, water is normally used to hydrate the membrane to improve its ionic conductivity. Hydration may also help to maintain the resilience of the membrane, reducing the potential for structural failure, which may occur if the membrane becomes too dry.

Conveniently, water is produced within the MEA as a product of the desired electrochemical reactions at the cathode. However, the quantity of water produced at the cathode is typically insufficient to keep the membrane suitably hydrated, so additional water is often introduced into one or both of the reactant streams, usually as water vapor. In conventional fuel cells, an objective is typically to keep water in the vapor phase in the vicinity of the MEA and to manage the cathode product water so that it evaporates into the cathode reactant stream.

The electrochemical reaction in a solid polymer fuel cell is typically exothermic. Accordingly, a cooling system is typically needed to control the temperature within a fuel cell to prevent overheating. Since a water supply is often present in conventional fuel cell systems for humidification, conventional designs have commonly used water as a coolant (see, for example, U.S. Pat. No. 5,200,278, hereby incorporated by reference herein in its entirety, which discloses a conventional fuel cell power generation system which employs water as a coolant).

However, because the solubility of the typical gaseous reactants in water is low, if water or aqueous liquids are introduced into a reactant fluid stream as a liquid coolant, the presence of the liquid coolant generally reduces the accessibility of the reactants to the electrocatalyst. Conventional fuel cells typically seek to avoid gas-liquid two phase flow within the reactant fluid passages by isolating liquid coolant streams from gaseous reactant streams by employing separate cooling fluid passages which are fluidly isolated from the reactant fluid passages (see for example, FIGS. 1, 2A and 2B in U.S. Pat. No. 5,230,966 and the accompanying description, which is hereby incorporated by reference herein in its entirety).

While conventional arrangements such as the one described in the preceding paragraph can control the temperature within a fuel cell stack, these arrangements generally require separate cooling layers (for example, coolant flow field plates) and manifolds for directing the coolant fluid through the stack. In a conventional fuel cell stack the cooling layers often occupy at least about one third of the plate volume. Therefore, the power density of a conventional fuel cell stack could be improved if the cooling layers could be eliminated. Furthermore, another disadvantage associated with separate cooling plates and a fluidly isolated cooling system is that additional seals and manifolds are required to contain the coolant and to keep the coolant fluidly isolated from the reactants.

Another problem associated with using water or other aqueous coolants in fuel cells is that such coolants may expand upon freezing and damage stack components. Also, frozen water in the active area can be difficult to remove since it must be melted and then purged to allow the reactant to access the catalyst. It is anticipated that fuel cells may be used in vehicles or installations where the fuel cell may be exposed to temperatures below the freezing temperature of water. For example, automobiles are typically designed for exposure to temperatures as low as −40° C. Therefore, when water or aqueous liquids are used as liquid coolants, conventional fuel cells intended for such applications need to incorporate features to prevent freeze expansion damage. This is another reason why conventional fuel cells avoid using water or aqueous coolants directly in the reactant stream passages. The porous electrodes and thin membrane are particularly susceptible to freeze expansion damage. As it is, precautions must be taken to deal with product water and reactant stream humidification water if the fuel cell is going to be exposed to freezing conditions.

Accordingly, there is a need for a method of operating a fuel cell, and an apparatus for implementing such a method, which reduces or eliminates some or all of the problems and disadvantages described above.

SUMMARY OF THE INVENTION

In the present approach, a method is provided for controlling temperature within an electrochemical fuel cell which comprises an electrolyte interposed between first and second electrodes and a quantity of electrocatalyst disposed at an interface between the electrolyte and each of the first and second electrodes. Such a method comprises:

(a) introducing to the first electrode a reactant fluid stream comprising a reactant and a heat transfer liquid, such that the reactant fluid stream contacts the first electrode;

(b) removing a reactant fluid exhaust stream from the first electrode, the reactant fluid exhaust stream comprising the heat transfer liquid; and (c) recirculating at least a portion of the heat transfer liquid from the reactant fluid exhaust stream to the first electrode via a heat exchanger, whereby the temperature of the heat transfer liquid is controlled.

Preferably the fuel cell is a solid polymer electrolyte fuel cell and the fuel cell is one of a plurality of fuel cells arranged in a stack. The reactant fluid stream may be pre-mixed, or the method may further comprise the step of combining the reactant with the heat transfer liquid to produce the reactant fluid stream.

The heat transfer liquid is not water, and preferably it is non-aqueous. However, the overall reactant fluid stream may comprise water.

For example, hydration water and reaction product water may be present in the reactant fluid stream. The heat transfer liquid may have other desirable characteristics, such as, for example, being aprotic and/or dielectric, for example, so that the heat transfer liquid does not cause current leakage or short circuiting. It is also preferable for the heat transfer liquid to be chemically unreactive towards other fluids within the reactant fluid stream and/or chemically unreactive towards fuel cell components that directly contact the reactant fluid stream.

Some examples of preferred heat transfer liquids are paraffin oils, fluorocarbons, and hydrocarbons. In particular, if the heat transfer liquid is a fluorocarbon, it may be a perfluorocarbon. Specifically, a preferred heat transfer liquid may be selected from the group consisting of methanol, perfluorooctane, perfluorotributylamine, 1-decene, perfluoroether, perfluorocyclic ether, perfluorotripropylamine, cis-perfluorodecalin, transperfluorodecalin, perfluoro-1-methyl decalin, perfluoroisopentyltetrahydropyrane, perfluoro-N,N-dimethylcyclohexylamine, perfluoroperhydrophenanthrene, and perfluorotriamylamine.

To facilitate the separation of the heat transfer liquid from hydration water and reaction product water in the reactant exhaust stream, it is preferable that the heat transfer liquid be substantially immiscible with the water. If the reactant exhaust stream also comprises excess reactant, excess reactant may also be recirculated. It may be recirculated along with the recirculated heat transfer liquid, or separated. Reactant recirculation may increase fuel cell efficiency by improving reactant utilization. A fluid separator may be used to separate the heat transfer liquid from water and/or excess reactant in the exhaust stream.

A temperature sensor may be used to monitor the fuel cell temperature, directly or indirectly, and provide data for controlling, for example, the amount of heat transfer liquid that is introduced to the reactant fluid stream, and the extent to which it is cooled or heated before being introduced into the fuel cell electrode. In this way, the temperature within the fuel cell may be maintained within a pre-set temperature range. The temperature sensor is preferably located so that it contacts the fluids in the recirculation subsystem or the reactant fluid passages or the fuel cell separator plates. A reactant concentration sensor may be used to control the amounts and proportion of reactant and heat transfer liquid so that a desired reactant concentration is supplied to the fuel cell. The desired reactant concentration is generally a function of the power demand. The reactant fluid stream may be pressurized above atmospheric pressure to increase the amount of reactant that may be carried by the reactant fluid stream.

The method may further comprise using the heat transfer liquid to purge reaction product water and excess hydration water from the fuel cell when the fuel cell is shut down. The reactant flow passages and porous electrodes may be flushed or filled with the heat transfer liquid upon shut down. This can be especially beneficial if the heat transfer liquid has a freezing point substantially below that of water, and the fuel cell is to be exposed to low temperature conditions.

During normal operation, the heat exchanger removes heat from the heat transfer liquid to cool it before it is re-introduced to the fuel cell reactant fluid passages. In a preferred method, the heat exchanger controls the temperature of the heat transfer liquid between a reactant fluid passage outlet and the heat transfer liquid reservoir.

In one embodiment, the method comprises dissolving a gaseous reactant in the heat transfer liquid to produce a one-phase reactant fluid supply stream. The dissolution step generally comprises mixing the reactant into the heat transfer liquid to produce the reactant fluid stream. For example, the reactant may be bubbled into the heat transfer liquid using a sparger or another type of gas-liquid contactor.

However, in a particularly preferred method, the gaseous reactant is mixed with the heat transfer liquid and the reactant fluid stream is introduced to the first electrode as a two-phase fluid stream. The two fluid streams may be combined, for example, by pressurizing one of the fluid streams and injecting it into the other fluid stream. In this embodiment, the reactant fluid stream is preferably, but not necessarily, recirculated. In one embodiment of this method, the reactant fluid is combined with the heat transfer liquid inside a reactant fluid passage or manifold within a fuel cell assembly.

In yet another embodiment, a heat transfer liquid may be introduced into the reactant fluid passages of both the anode and the cathode. That is, both the oxidant and fuel fluid streams may comprise a heat transfer liquid. The same heat transfer liquid may be introduced into both oxidant and fuel fluid streams, or alternatively, different heat transfer liquids may be employed.

The method of the invention may be practiced by employing an electrochemical fuel cell power generation system, which comprises:

(a) a plurality of fuel cell assemblies arranged in a stack, wherein each of the plurality of fuel cell assemblies comprises:
  an electrolyte interposed between a first electrode and a second electrode;
  a quantity of electrocatalyst disposed at interfaces between the electrolyte and the first electrode and the second electrode;
  a first reactant fluid passage adjacent the first electrode having an inlet and an outlet;
  a second reactant fluid passage adjacent the second electrode having an inlet and an outlet;

(b) a first reactant supply subsystem comprising a first reactant supply manifold which fluidly connects a first reactant supply to the first reactant fluid passage;

(c) a second reactant supply subsystem comprising a second reactant supply manifold which fluidly connects a second reactant supply to the second reactant fluid passage;

(d) a heat transfer liquid supply subsystem comprising a reservoir which is fluidly connected to the first reactant fluid passage inlet, for introducing a heat transfer liquid into the first reactant fluid passage;

(e) a recirculation subsystem comprising a recirculation fluid passage fluidly connecting the first reactant fluid passage outlet to the first reactant fluid passage inlet; and (f) a heat exchanger, disposed in the recirculation passage between the first reactant fluid passage outlet and the first reactant fluid passage outlet, for controlling the temperature of the heat transfer liquid.

The recirculation subsystem preferably directs the recirculated heat transfer liquid to the heat transfer liquid reservoir. Alternatively, the recirculated heat transfer liquid may by-pass the heat transfer liquid reservoir and join the first reactant fluid stream downstream of the heat transfer liquid reservoir.

The heat transfer liquid supply subsystem preferably further comprises a mixer for mixing the heat transfer liquid with the first reactant. The mixing may be accomplished by introducing the first reactant into the heat transfer liquid, but preferably, the heat transfer liquid is introduced into the first reactant. For example, the first reactant may be introduced into a heat transfer liquid reservoir or mixing tank, using a mixer such as a sparger, diffuser, or other type of gas-liquid contactor.

Alternatively, the heat transfer liquid may be injected into the first reactant using a mixer such as, for example, an injector or an atomizer. The injector nozzle is preferably oriented so it is aligned with the flow direction of the receiving fluid stream so that the injected fluid flows in the same general direction as the receiving fluid. The fuel cell power generation system may employ an injector that is external or internal to the fuel cell stack. For example, an internal injector may have an injector nozzle positioned at each of the first reactant fluid passage inlets. The injector may be supplied by a manifold that may be positioned within the fuel cell stack. Conveniently, the heat transfer liquid manifold may be positioned within a manifold that supplies the first reactant to the first reactant fluid passage. An advantage of this arrangement is that heat transfer liquid is supplied directly to each fuel cell assembly in the fuel cell stack and there is no opportunity for the heat transfer liquid to separate from the first reactant before being directed to the individual fuel cell assemblies. As shown by the above-described arrangements, the mixing location may be positioned anywhere between the heat transfer liquid reservoir and the entrance to the fuel cell fluid passages.

The heat transfer liquid reservoir may be a pressure vessel. If the first reactant is added to the heat transfer liquid in the reservoir, an advantage of pressurizing the reservoir is that at higher pressures more reactant can be dissolved in the heat transfer liquid. Alternatively, if the heat transfer liquid is added to the first reactant downstream of the reservoir, higher pressure is desirable for injecting the heat transfer liquid into the first reactant. The heat transfer supply subsystem may further comprise a pump for raising the pressure of the heat transfer liquid prior to injection.

A preferred recirculation subsystem further comprises a fluid separator for separating at least a portion of the heat transfer liquid from some or all of the other components of the first reactant exhaust stream and directing it to the heat transfer liquid supply subsystem. Accordingly, the separator is located downstream of the first reactant fluid passage outlet and upstream of the first reactant fluid passage inlet.

In a preferred embodiment of the fuel cell power generation system, a heat exchanger is located in the recirculation subsystem between the first reactant fluid passage outlets and the heat transfer liquid reservoir, so that the temperature of the heat transfer liquid may be controlled prior to recirculating the heat transfer liquid back to the reservoir. However, in an alternative embodiment, a heat exchanger may be located between the heat transfer liquid reservoir and the first reactant fluid passage inlets. In further alternative embodiments, a plurality of heat exchangers may be employed for controlling the temperature of the heat transfer liquid at more than one location in the fuel cell power generation system.

In another embodiment of the present fuel cell power generation system, the heat transfer liquid supply subsystem may be fluidly connected to both the first and second reactant fluid passages. An advantage of this arrangement is that heat transfer liquid flows in both of the first and second reactant fluid passages, increasing the direct contact between the heat transfer liquid and the fuel cell components. To recirculate the heat transfer liquid, the recirculation subsystem comprises a first recirculation fluid passage associated with the first reactant fluid passage and a second recirculation fluid passage associated with the second reactant fluid passage. In this embodiment, the recirculation subsystem preferably includes a fluid separator associated with each of the recirculation fluid passages to prevent interaction between any excess first and second reactants that may be present in the first and second exhaust fluid streams. In a preferred embodiment of this fuel cell power generation system, to ensure that the reactant streams do not mix in the heat transfer liquid reservoir, separate heat transfer liquid reservoirs are employed for receiving the recirculated oxidant and fuel exhaust fluid stream.

An advantage of the present fuel cell power generation system is that power density is increased by eliminating separate cooling layers. That is, more power can be produced by the present fuel cell stack compared to a conventional fuel cell stack with the same dimensions, or the present fuel cell stack can be made smaller than a conventional fuel cell stack and still produce the same amount of power. Eliminating separate cooling layers also reduces manufacturing steps and eliminates components associated with separate cooling layers such as fluid seals. Eliminating such components improves reliability by reducing the number of components that may potentially require maintenance service.

A further advantage is that, since pure water is not used as a coolant, the present fuel cell stack is more tolerant to exposure to cold temperatures. This tolerance to exposure to cold temperatures can be further improved by using a heat transfer liquid with a suitably low freezing point to purge product water and excess hydration water from the fuel cell upon shut down.

BRIEF DESCRIPTION OF THE DRAWINGS

The advantages, nature and additional features of the invention will become more apparent from the following description, together with the accompanying drawings, which illustrate specific embodiments of a fuel cell power generation system.

With reference to all of the FIGURES, like numbers are used to denote like components.

DETAILED DESCRIPTION OF PREFERRED EMBODIMENT(S)

Figure 1:
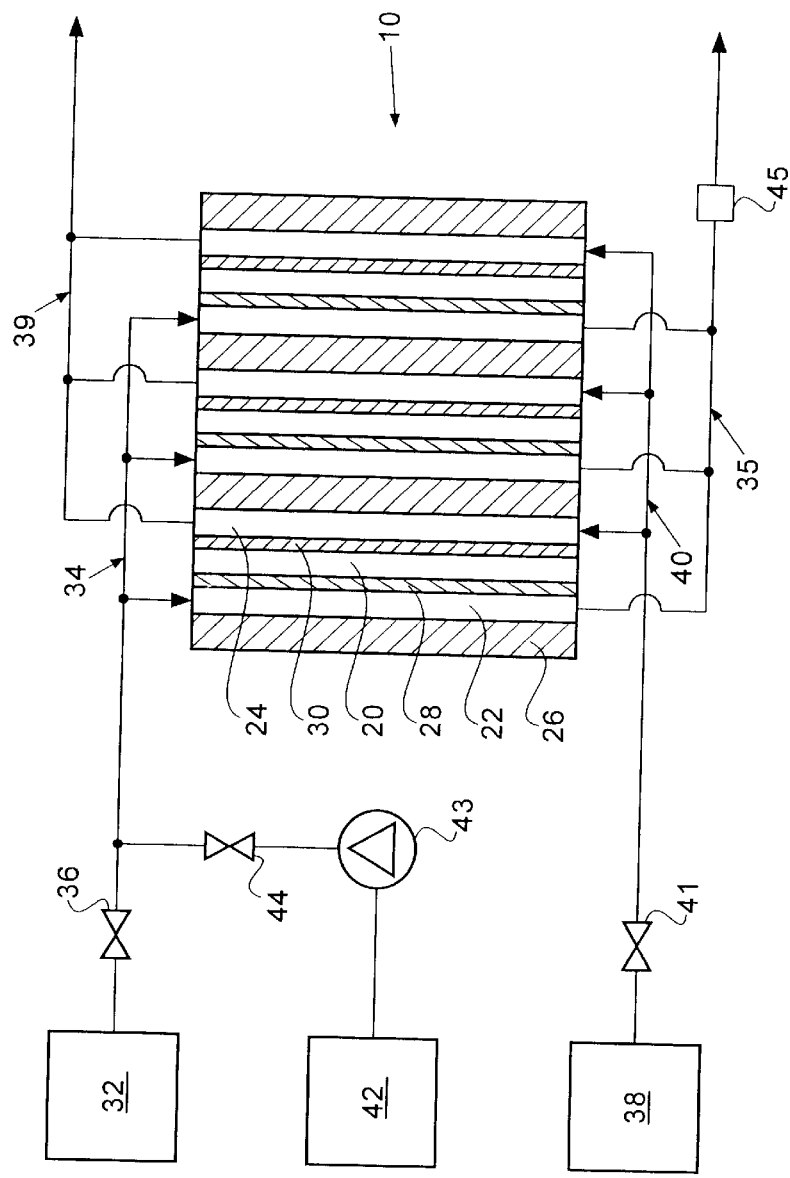
FIG. 1 is a schematic illustration of an embodiment of a fuel cell power generation system in which a heat transfer liquid is introduced into the oxidant supply stream and thereby directed to oxidant fluid passages of a fuel cell stack.

FIG. 1 is a schematic diagram of an electrochemical fuel cell power generation system comprising a plurality of fuel cell assemblies arranged in a fuel cell stack 10, a fuel supply subsystem 38, an oxidant supply subsystem 32, and a heat transfer liquid supply subsystem 42. The heat transfer liquid is a liquid other than water that usually functions as a heat transfer and/or evaporative coolant to dissipate heat produced by exothermic reactions, which are induced within fuel cell stack 10. However, in certain circumstances it may be desirable to utilize the heat transfer liquid to heat fuel cell stack 10. For example, if fuel cell stack 10 is started after prolonged exposure to a cold environment, during the start-up phase, when the temperature of the fuel cell stack is well below the normal operating temperature, it may be desirable to utilize the heat transfer liquid to warm the fuel cell stack to a desirable operating temperature. Preferably, the heat transfer liquid is non-aqueous, remains in the liquid phase and does not expand at temperatures below the freezing temperature of water to which the stack may be exposed. Accordingly, the heat transfer liquid may be used to cool or heat the fuel cell stack, depending upon the circumstances.

Fuel cell stack 10 is depicted schematically, showing various layers of the stack without showing the housing, internal manifolds, or sealing mechanisms which prevent intermixing of reactants. FIG. 1 illustrates the stacked electrochemically active layers of three electrochemical fuel cell assemblies. In particular, for each fuel cell assembly, these layers are the electrolyte 20, a cathode 22, and an anode 24, all disposed between a pair of flow field plates, which are also known as separator plates 26. A single separator plate 26 may be shared between two adjacent fuel cell assemblies.

The electrochemically active area of the fuel cells is defined by a cathode electrocatalyst 28 disposed at an interface between electrolyte 20 and cathode 22 and an anode electrocatalyst 30 disposed at an interface between electrolyte 20 and anode 24. In a preferred embodiment, electrolyte layer 20 comprises an ion exchange membrane.

Oxidant supply subsystem 32 and heat transfer liquid supply subsystem 42, supply an oxidant fluid stream comprising an oxidant and a heat transfer liquid to oxidant supply manifold 34. Oxidant supply manifold 34 is shown as an external manifold for illustrative purposes, but an internal manifold passing through the thickness of the layers of fuel cell stack 10 is also a preferred embodiment. Oxidant supply manifold 34 directs the oxidant fluid stream to oxidant fluid passages of each of the individual fuel cell assemblies. In turn, oxidant fluid passages direct the oxidant fluid stream to cathode 22 such that the oxidant contacts electrocatalyst 28. An oxidant exhaust manifold 35 is employed to direct an oxidant exhaust stream comprising any excess oxidant, humidification water, heat transfer liquid and product water from stack 10.

Valve 36 may be used to shut off the oxidant supply stream and/or to control the amount of oxidant supplied to fuel cell stack 10. Oxidant supply subsystem 32 typically comprises a purification unit and a blower or compressor. The purification unit may comprise, for example, filters for removing particulate contaminants from air, which may be the source of the oxidant supply stream. In some applications, such as space vehicles or submarines, the oxidant may be supplied from a pressure vessel that contains air or substantially pure oxygen under pressure.

An embodiment of heat transfer liquid supply subsystem 42 comprises a reservoir, pump 43, and valve 44. Pump 43 may be employed to pressurize the heat transfer liquid before combining it with the oxidant fluid. Valve 44 may be used to shut off or regulate the flow of the heat transfer liquid that may be introduced continuously or intermittently. The temperature of the oxidant fluid exhaust stream may be monitored with temperature sensor 45. If the temperature deviates from a preset temperature range, the flow rate of the heat transfer liquid can be adjusted to control the temperature so that it remains within the preset temperature range. Temperature sensor 45 may alternatively monitor the temperature at another location in the fuel or oxidant fluid stream, or monitor the temperature of one or more of separator plates 26. An injector, such as, for example, the ones shown in FIGS. 7 and 8 may be used to introduce the heat transfer liquid into the oxidant fluid stream.

Fuel supply subsystem 38 supplies a fuel stream to fuel supply manifold 40. Fuel supply manifold 40 is shown as an external manifold for illustrative purposes, but an internal fuel supply manifold is also a preferred embodiment. Fuel supply manifold 40 directs the fuel stream to fuel fluid passages and anode electrocatalyst 30 of each of the individual fuel cell assemblies. The fuel stream may be exhausted from stack 10, recirculated, or dead-ended, depending on the fuel and the desired mode of operation. However, even for dead-ended operation, an exhaust manifold 39 is typically provided so that the fuel fluid passages may be periodically purged by opening a purge valve (not shown in FIG. 1) which is closed during dead-ended operation.

Valve 41 may be used to shut off the fuel supply stream and/or to regulate the amount of fuel supplied to fuel cell stack 10. Fuel supply subsystem 38 comprises a fuel tank that contains fuel, which may be stored under pressure. Fuel supply subsystem 38 typically further comprises a compressor or pump for directing the fuel supply stream to fuel cell stack 10. Fuel supply 38 may additionally comprise a reformer and other fuel processing equipment for producing a gaseous hydrogen-containing stream from a fuel such as methanol.

Unlike conventional fuel cell stacks, the fuel cell power generation system shown in FIG. 1 introduces a liquid coolant (that is, the heat transfer liquid) directly into the oxidant fluid passages of each cell. Moreover, unlike conventional coolants, the heat transfer liquid is not water. Preferably it is a non-aqueous liquid which is mixed with a gaseous reactant and introduced into the fuel cell assemblies as a two-phase fluid. An advantage of the present fuel cell power generation system is that separate cooling plates may be eliminated to provide a more compact fuel cell stack with a greater power density. Additionally, heat dissipation can be achieved through direct contact between the heat transfer liquid and the fuel cell components where the heat is generated. The heat from the exothermic reactions does not need to be thermally conducted through a separator plate to a fluidly isolated coolant, since, in the disclosed embodiments, the heat transfer liquid flows through the same reactant fluid passages which direct the reactants to the fuel cell electrodes.

Aprotic heat transfer liquids which are substantially immiscible with water, such as paraffin oils, fluorocarbons, and hydrocarbons, may be employed. Preferred fluorocarbons are perfluorocarbons such as, for example, perfluorooctane, perfluorotributylamine, perfluorotriamylamine, methoxynonafluorobutane, ethoxynonafluorobutane, perfluoroether, perfluorocyclic ether, perfluorotripropylamine, cis-perfluorodecalin, transperfluorodecalin, perfluoro-1-methyl decalin, perfluoroisopentyltetrahydropyrane, perfluoro-N,N-dimethylcyclohexylamine, perfluoroperhydrophenanthrene, perfluorotriamylamine, and mixtures of perfluorocarbons with other perfluorocarbons or other suitable liquids. With liquid mixtures, the component liquids are preferably miscible with each other.

Unlike water and some aqueous liquids, non-aqueous liquids generally do not expand upon freezing. Accordingly, non-aqueous heat transfer liquids will not cause freeze-expansion damage to the porous internal components of a fuel cell. Therefore, non-aqueous heat transfer liquids may be left inside the internal fluid passages of a fuel cell which is exposed to cold temperatures and such liquids may also be used to purge product and excess hydration water from the fuel cell upon shut down. In addition to reducing the danger of freeze expansion damage, the selected heat transfer liquid may also have a lower freezing temperature than water and/or higher reactant solubility. Preferably, the selected heat transfer liquid remains in the liquid phase at temperatures as low as $-40°$ C. A higher reactant solubility than in water is desirable so that, compared to water, the heat transfer liquid will be less likely to inhibit the supply of reactant to the electrode electrocatalyst. Furthermore, to reduce the effects of electrocatalyst poisoning, a heat transfer liquid may be selected which has a low solubility for carbon monoxide or other electrocatalyst poisons.

Protic liquids, such as various alcohols, diols and polyols may also have some or all of the desirable characteristics set out herein, and may thus be suitable heat transfer liquids in some circumstances.

Figure 2:
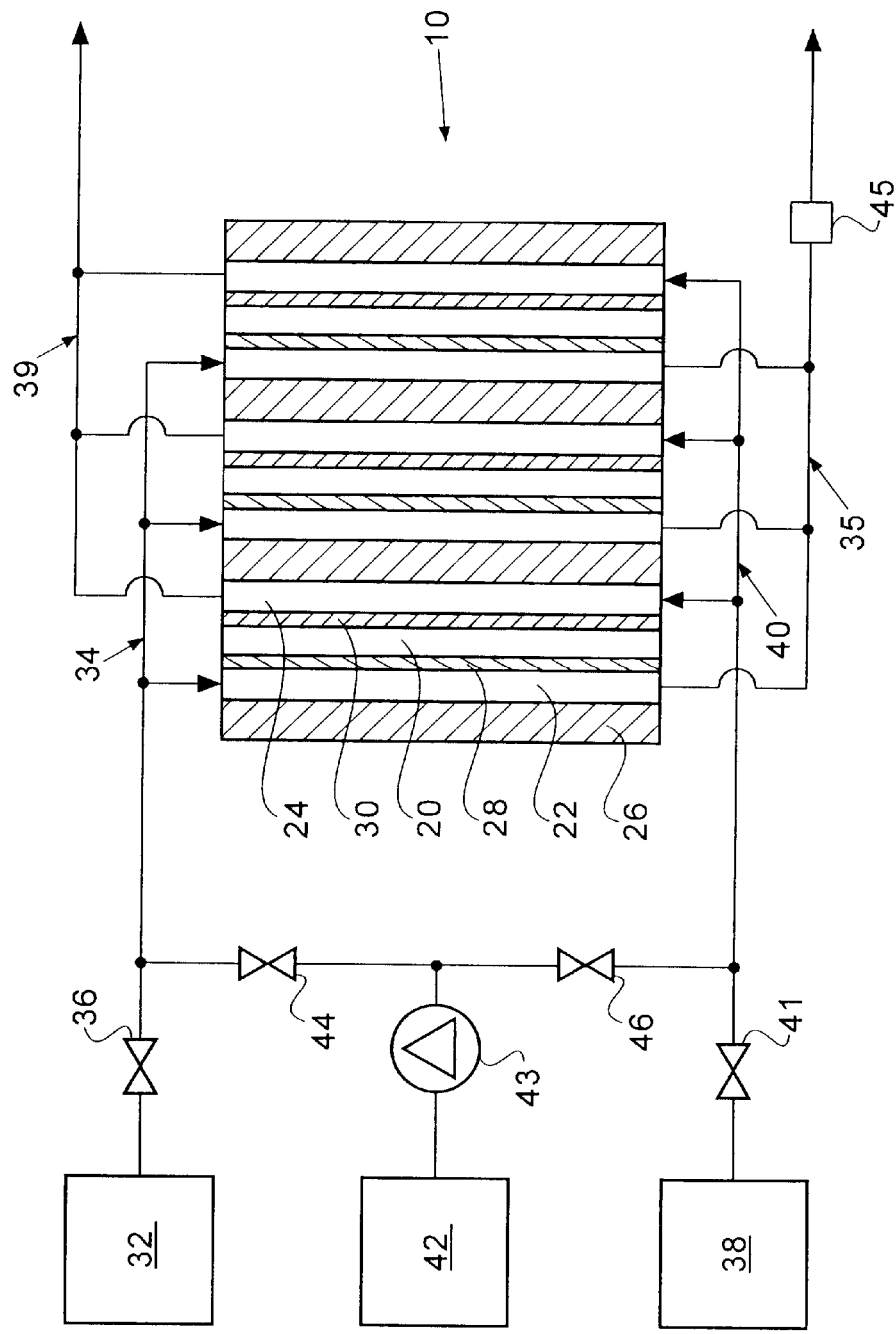
FIG. 2 is a schematic illustration of an embodiment of a fuel cell power generation system in which a heat transfer liquid is introduced into each of the oxidant and fuel streams and thereby directed into each of respective oxidant and fuel fluid passages within a fuel cell stack.

With reference to FIGS. 2 through 6, the fuel cell assemblies are generally the same as the fuel cell assemblies depicted in FIG. 1. In the embodiment of FIG. 2, heat transfer liquid supply subsystem 42 supplies a heat transfer liquid to both the oxidant fluid stream and the fuel fluid stream. In an alternative embodiment, two separate coolant supply subsystems may be used (not shown), each similar to the arrangement in FIG. 1, allowing different heat transfer liquids to be introduced into the respective oxidant and fuel fluid streams.

In the embodiment of FIG. 2, pump 43 is used to increase the pressure of the heat transfer liquid prior to introducing it into the fuel and/or oxidant fluid streams. Valves 44 and 46 may be used to shut off and/or control the flow of the heat transfer liquid supplied to the respective oxidant and fuel supply manifolds 34 and 40.

In the embodiments illustrated by FIGS. 1 and 2, the reactant exhaust streams are not necessarily recirculated and may be discharged to the atmosphere. However, in other embodiments, such as those depicted in FIGS. 3 through 6, at least the heat transfer liquid is recirculated through the fuel cells. It may be separated from the reactant exhaust, cooled, and recirculated to a heat transfer liquid reservoir prior to being directed to the fuel cell stack again.

Figure 3:
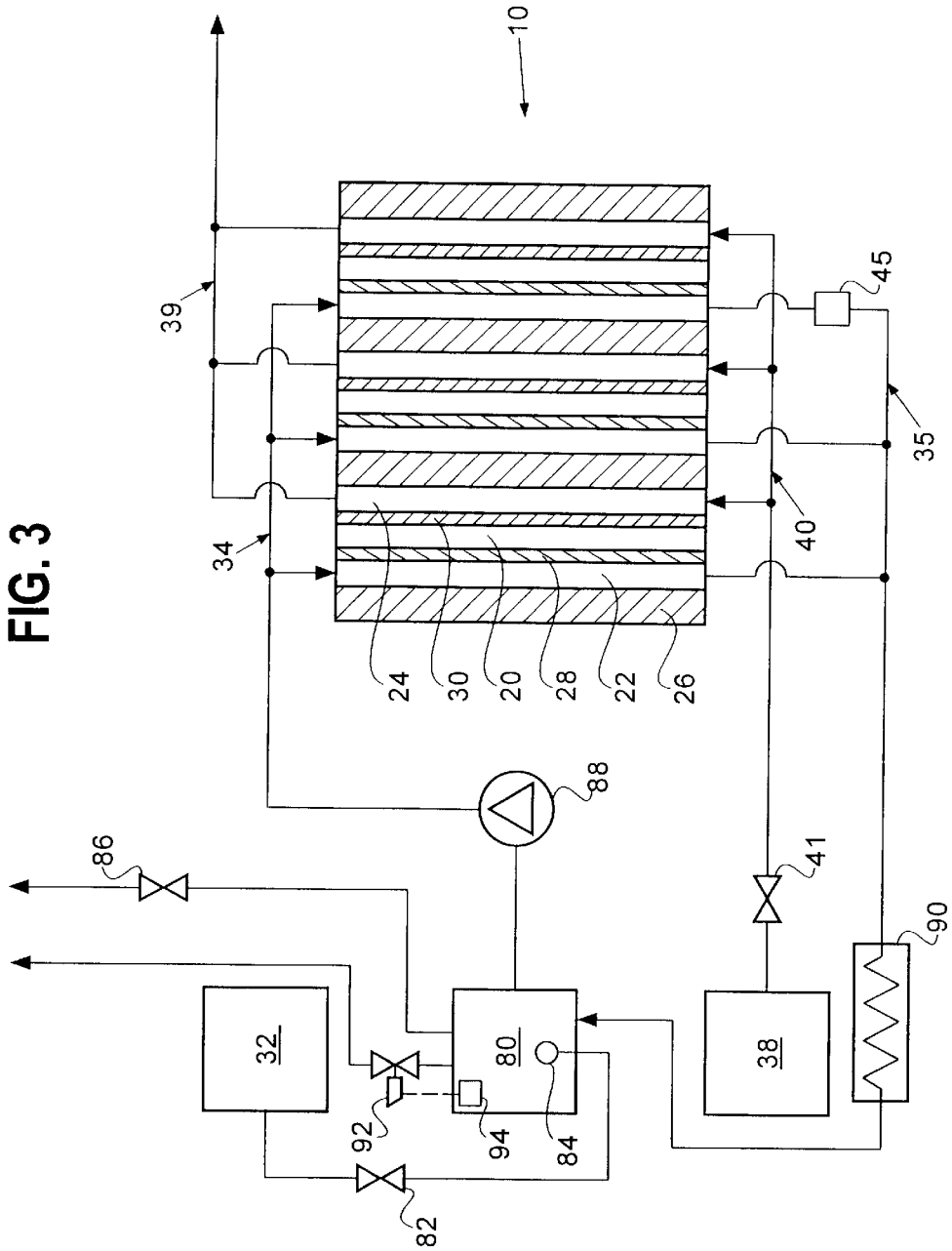
FIG. 3 is a schematic illustration of an embodiment of a fuel cell power generation system wherein the oxidant is dissolved in a heat transfer liquid to form an oxidant supply stream which is directed to fuel cell assemblies within a fuel cell stack. Heat transfer liquid exiting the fuel cell stack with the oxidant exhaust stream is passed through a heat exchanger and recirculated to a heat transfer liquid reservoir.

FIG. 3 illustrates an embodiment of a fuel cell power generation system wherein the oxidant is dissolved in the heat transfer liquid and the resultant single-phase liquid oxidant supply stream is directed to fuel cell cathodes 22. In this embodiment, to ensure a sufficient supply of oxidant to sustain the desired electrochemical reactions, a heat transfer liquid that has high oxygen solubility is preferably employed. For example, the heat transfer liquid preferably has an oxygen solubility greater than 25% by weight measured at 1 atmosphere and 25° C. Fluids such as perfluorooctane, perfluorocyclic ether, perfluorotributylamine, perfluorotripropylamine, cis-perfluorodecalin, transperfluorodecalin, perfluoro-1-methyl decalin, perfluoroisopentyltetrahydropyrane, perfluoro-N,N-dimethylcyclohexylamine, perfluoroperhydrophenanthrene, and perfluorotributylamine, may therefore be suitable.

In this embodiment, oxidant supply subsystem 32 supplies the oxidant directly to heat transfer liquid reservoir 80. Valve 82 is provided for controlling the flow of oxidant to reservoir 80. Within reservoir 80, mixer 84 introduces the gaseous oxidant into the heat transfer liquid, whereby some of the oxidant dissolves in the liquid, producing an oxygenated heat transfer liquid. Mixer 84 is preferably a sparger that introduces the gaseous oxidant as small bubbles into the heat transfer liquid. Alternatively, mixer 84 may be other gas-liquid contactor devices, such as, for example, diffusers or aerators. Reservoir 80 is preferably pressurized to increase the amount of oxidant that can be dissolved in the heat transfer liquid, which is preferably saturated with oxidant. Valve 86 may be used to control the venting of the excess oxidant from reservoir 80.

The oxygenated heat transfer liquid is drawn from reservoir 80 and pump 88 is employed to supply the pressurized oxygenated heat transfer liquid to fuel cell stack 10. The liquid exhausted from cathodes 22 through exhaust manifold 35 is returned to reservoir 80 via heat exchanger 90 which may be used for cooling the exhaust stream. The solubility of the oxidant in the heat transfer liquid generally decreases with increasing temperature. Therefore, it is also preferable for this reason to reduce the temperature of the heat transfer liquid prior to returning it to reservoir 80.

Temperature sensor 45 is positioned to monitor the temperature of the oxidant exhaust stream in exhaust manifold 35. If the temperature is higher than a pre-set temperature range, then the flow rate of the oxidant fluid stream may be increased, or the performance of heat exchanger 90 may be adjusted, for example, by increasing the speed of a fan, if air cooled, or increasing the flow rate of a chilled coolant which is directed to heat exchanger 90. If the temperature is lower than a pre-set temperature range, then heat exchanger 90 could be by-passed, or the performance of heat exchanger 90 may be adjusted, for example, by decreasing the speed of a fan, if air cooled, or decreasing the flow rate of a chilled coolant which is directed to heat exchanger 90.

Reaction product water and any hydration water that is exhausted from cathodes 22 may accumulate in reservoir 80. Purge valve 92 controlled by level indicator 94 may be used to remove accumulations of product water from reservoir 80, provided the heat transfer liquid is substantially immiscible with water.

Figure 4:
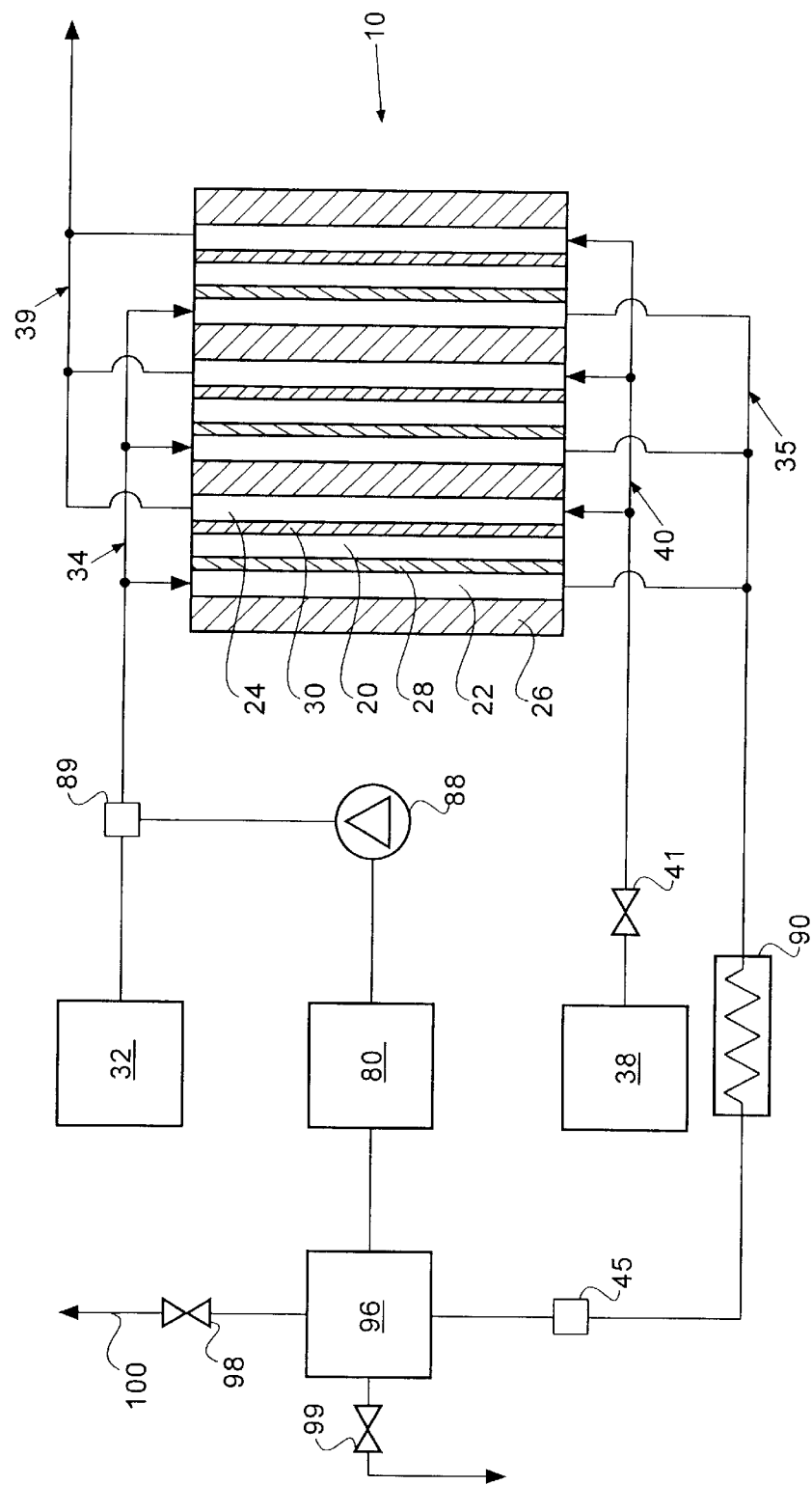
FIG. 4 is a schematic illustration of an embodiment of a fuel cell power generation system wherein a two-phase oxidant supply stream comprising a heat transfer liquid and a gaseous oxidant is directed to fuel cell assemblies within a fuel cell stack. Heat transfer liquid exiting the fuel cell stack with the oxidant exhaust stream is passed through a heat exchanger and recirculated to a heat transfer liquid reservoir.

FIG. 4 illustrates an embodiment of a fuel cell power generation system in which a two-phase oxidant stream is introduced into oxidant fluid passages within fuel cell stack 10. In particular, a gaseous oxidant is combined with a heat transfer liquid using injector 89, such as, for example, the external injector of FIG. 7 or the internal injector of FIG. 8. In this embodiment, since the oxidant is directed to the electrochemically active area in gaseous form, the oxygen solubility of the heat transfer liquid is less important. Nevertheless, a heat transfer liquid that has high oxygen solubility is still preferred for improving the accessibility of the oxygen to the cathode electrocatalyst 28. The heat transfer liquid contained within reservoir 80 need not be pressurized. Pump 88 may be used to raise the pressure of the heat transfer liquid upstream of injector 89.

In this embodiment, the heat transfer liquid is recirculated by directing the oxidant exhaust stream exiting stack 10 via manifold 35 back to reservoir 80 via heat exchanger 90 and fluid separator 96. Fluid separator 96 is employed to separate the excess gaseous oxidant and/or reaction products (for example, water) from heat transfer liquid present in the exhaust stream. Valve 98 may be used to control the removal of gas from fluid separator 96 through exhaust vent 100. Valve 99 may be used to drain separator 96 or to periodically remove accumulated water.

In FIG. 4, temperature sensor 45 is located downstream of heat exchanger 90. The preset temperature range selected for a fuel cell power generator system must be calibrated in accordance with the location of temperature sensor 45. Those skilled in the art will understand that temperature sensor 45 may be located at any convenient location in thermal contact with the fuel cell assemblies or the fluid streams exhausted from these assemblies.

Figure 5:
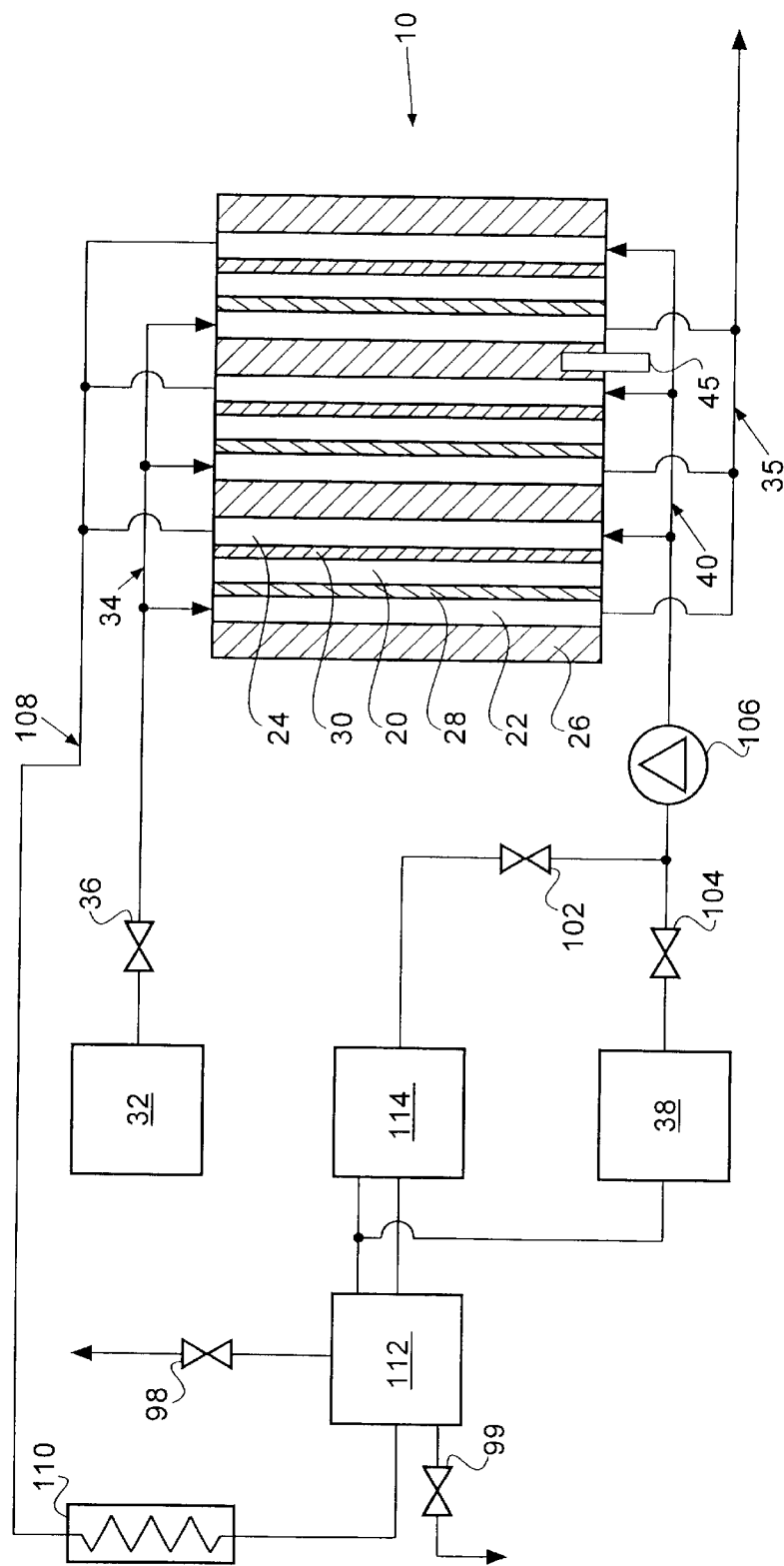
FIGS. 5 and 6 are schematic illustrations of embodiments of fuel cell power generation systems wherein a two-phase fuel supply stream comprising a heat transfer liquid and a gaseous fuel is directed to fuel cell assemblies within a fuel cell stack. The fuel fluid and the heat transfer liquid exhausted from the fuel cell stack are directed through a heat exchanger and recirculated to a fluid reservoir.

FIG. 5 illustrates an embodiment of a fuel cell power generation system in which a two-phase fuel stream is introduced into fuel fluid passages within fuel cell stack 10. In particular, a hydrogen-containing gas stream is combined with a heat transfer liquid.

In the embodiment of a fuel cell power generation system illustrated in FIG. 5, the fuel fluid stream is recirculated. This is a preferred embodiment because the recirculation allows the heat transfer liquid flow rate to be adjusted to control the temperature within fuel cell stack 10. Increasing the fuel fluid stream flow rate generally increases the amount of excess fuel supplied to fuel cell stack 10 at a given time, but the recirculation arrangement redirects the excess unreacted fuel to stack 10 so that actual fuel consumption is not affected by increased flow rates. Valves 102 and 104 may be used to control the supply of heat transfer liquid from reservoir 114 and fuel from subsystem 38, respectively, thereby controlling the proportions of each fluid in the combined fuel fluid stream. In the illustrated embodiment, the gaseous fuel and the heat transfer liquid are combined upstream of pump 106. Pump 106 directs the two-phase fluid directly to fuel fluid passages within fuel cell stack 10.

The fuel exhaust stream from fuel cell stack 10 is directed via fuel exhaust manifold 108 and heat exchanger 110 to fluid separator 112. Heat exchanger 110 cools the fuel exhaust stream and fluid separator 112 separates the heat transfer liquid from any excess gaseous fuel, recirculating the excess fuel to the fuel supply subsystem 38 and the heat transfer liquid to reservoir 114. Valve 98 may be used to vent gases from fluid separator 112. If the heat transfer liquid is substantially immiscible with water, valve 99 may be used to remove water from fluid separator 112.

In FIG. 5, temperature sensor 45 is a temperature probe that is in direct contact with separator plate 26. A plurality of temperature sensors may be used to monitor the temperature of one of separator plates 26 and/or at least one of the reactant fluid exhaust streams.

Figure 6:
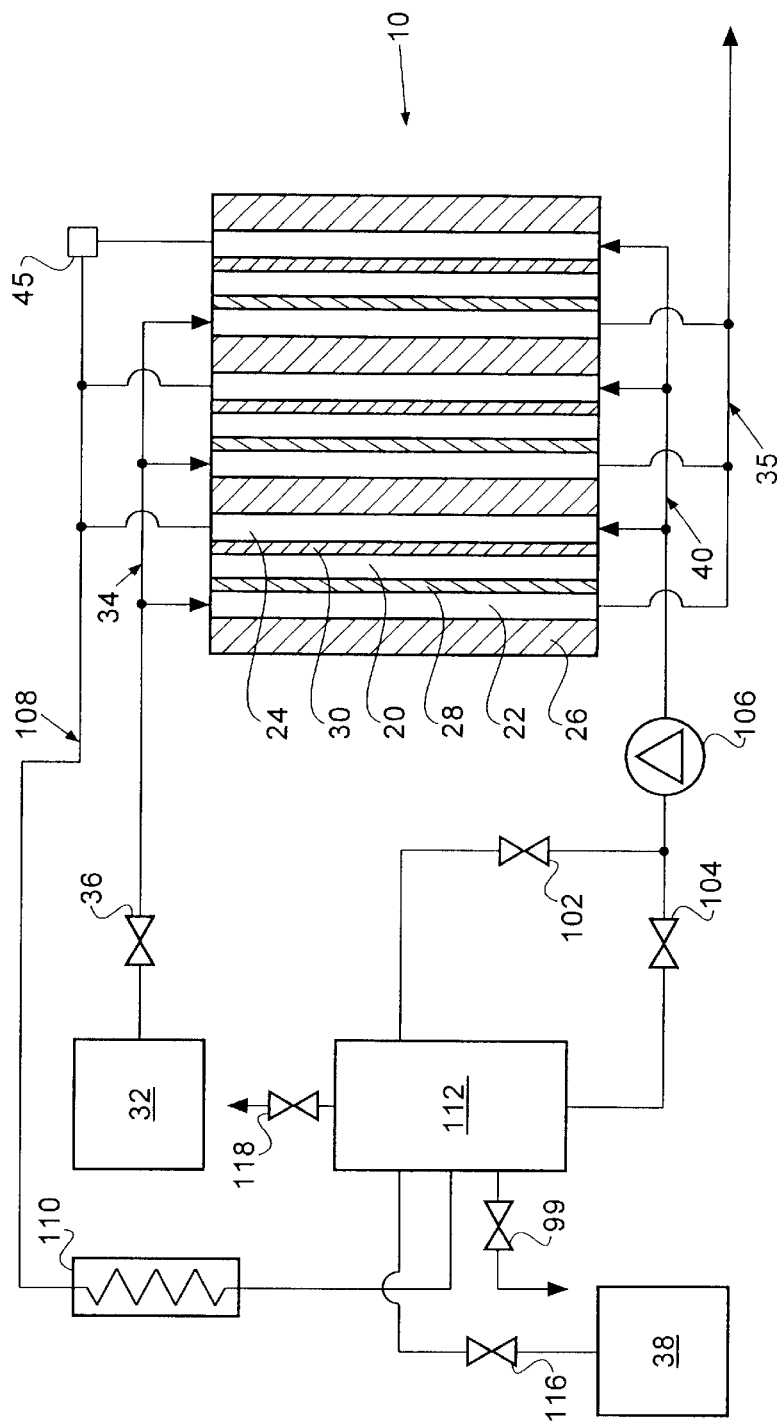

FIG. 6 illustrates an embodiment of a fuel cell power generation system which is like the embodiment of FIG. 5 except that fluid separator 112 serves as both a separator and a reservoir for the heat transfer liquid and the recirculated fuel. Fresh fuel is supplied to separator 112 via valve 116. Fuel venting from separator 112 is controlled by valve 118. Separator 112 is preferably kept pressurized. Valves 102 and 104 adjust the proportions of fuel and heat transfer liquid which are supplied to the fuel cell assemblies by recirculation pump 106.

In the methods, which introduce a two-phase liquid into the reactant fuel cell passages, a preferred fuel cell assembly comprises fluid passages that have surfaces that are repellent to the liquid component of the reactant fluid stream.

In the embodiments of fuel cell power generation systems illustrated by FIGS. 4 through 6, a heat exchanger is shown in a preferred location in the recirculation subsystems. However, alternative embodiments may employ one or more heat exchangers in this and/or other locations to effectively adjust the temperature of the reactant stream comprising the heat transfer liquid. For example, a heat exchanger may be located to adjust the temperature of the heat transfer liquid upstream of stack 10 but downstream of the heat transfer liquid supply subsystem.

Figure 7:
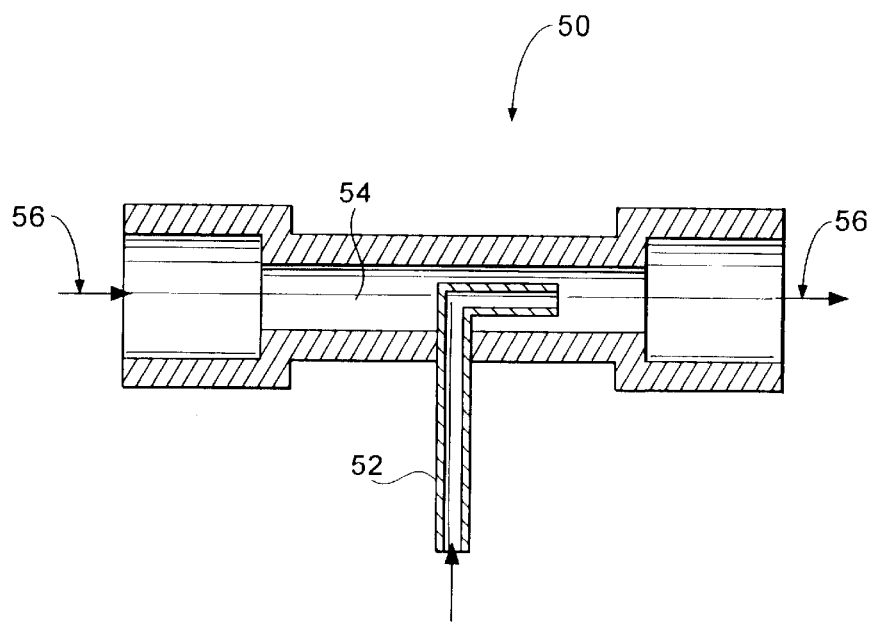
FIG. 7 is a cross-sectional view of an external injector, which is an embodiment of a device for combining a heat transfer liquid with a reactant fluid.

FIG. 7 shows a cross-section of an external injector 50 which may be used to introduce a heat transfer liquid into a reactant fluid stream upstream of a fuel cell stack reactant supply manifold. Pressurized heat transfer liquid is introduced through tube 52 that has an outlet that has its axis parallel to the axis of reactant supply conduit 54. The reactant travels in the direction of arrows 56. The diameter of the reactant supply conduit 54 may be reduced to a smaller diameter at the injection point to increase the velocity of the reactant passing through injector 50 to reduce liquid accumulation downstream of the injector. In the alternative, the external injector of FIG. 7 may also be used to inject a gaseous reactant into the heat transfer liquid.

Figure 8:
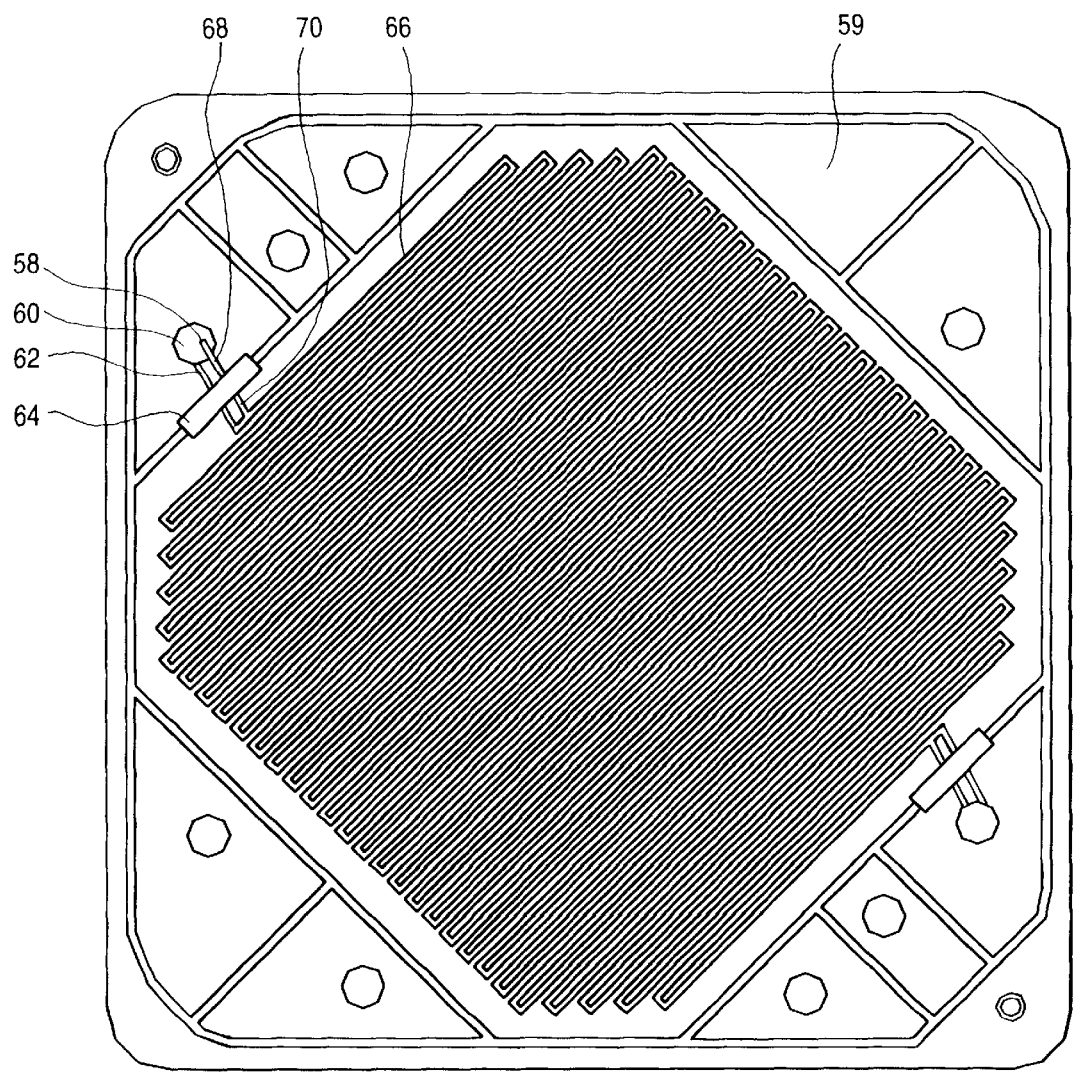
FIG. 8 is a plan view of a flow field plate and an internal heat transfer liquid injector. In this embodiment the injector introduces a heat transfer liquid directly into a reactant fluid stream within a fuel cell assembly.

FIG. 8 shows an internal injector 58 positioned in a reactant flow field plate 59 that is shown in plan view. A heat transfer liquid supply manifold, perpendicular to the plane of plate 59 (not shown), may be inserted within an internal reactant supply manifold 60. In the illustrated embodiment, a reactant is supplied to flow field channels in plate 59 from reactant supply manifold 60 via inlet channel 62 which passes underneath bridge member 64. Inlet channel 62 connects with a flow field channel 66 that forms a part of the reactant fluid passages which direct the reactant fluid stream to the electrochemically active area of the adjacent MEA (not shown). The embodiment of FIG. 8 employs reactant fluid passages which are arranged in a serpentine configuration, however, any reactant fluid passage configuration may be employed to direct the reactant fluid stream to the electrode electrochemically active area. Internal injector 58 has a nozzle 68 that is open to an injector channel 70. Injector channel 70 passes underneath bridge member 64 and joins with flow field channel 66. The heat transfer liquid is combined with the reactant fluid stream where injector channel 70 joins flow field channel 66.

In a fuel cell stack, the heat transfer liquid supply manifold extends through the thickness of the stack and employs a separate branch for supplying heat transfer liquid to each plate 59. Each branch preferably employs a nozzle that supplies the heat transfer liquid directly to the entrance of the respective reactant fluid passage.

Several embodiments of a fuel cell power generation system have been described above. In the five examples described below, four of these embodiments were employed in experiments that showed that fuel cells could be operated with a heat transfer liquid flowing in the same fluid passages as a reactant. More particularly, the results of the experiments demonstrate this combined reactant-heat transfer liquid stream may be a two-phase reactant gas-liquid coolant stream, or a one-phase liquid stream with a reactant dissolved in a heat transfer liquid. Further, the combined reactant-coolant fluid stream can be used to control the temperature within the fuel cell assemblies without the need for separate cooling plates. That is, separate fluid passages were not needed for circulating a coolant fluid within the fuel cell assembly.

EXAMPLE 1

In this example, a two-phase fuel fluid stream comprising gaseous hydrogen as the principal reactant combined with liquid methanol as a heat transfer liquid, was introduced to the anode of an operating Ballard™ Mark 7 fuel cell (in an arrangement similar to FIG. 2, except that in this experiment, only a single cell was used and no heat transfer liquid was introduced into the oxidant fluid stream). For fuel cell systems which employ methanol reformate as the gaseous fuel, this embodiment is particularly advantageous because the same methanol source may be used to supply the reformer and the two-phase fuel fluid stream. In this embodiment, in addition to serving as a coolant, methanol may also advantageously participate in electrochemical reactions that are induced to produce electrical current. In this experiment the oxidant stream was air, and the fuel stoichiometry at the anode was varied under the following operating conditions:

Oxidant fluid stream pressure: 260 kPa absolute (2.6 bar absolute)
Oxidant stoichiometry: 6.0
Oxidant temperature (at inlet): 73.5° C.
Fuel composition:
  72.5% hydrogen
  24.7% carbon dioxide
  2.8% nitrogen
  10 ppm carbon monoxide
Heat transfer liquid:
  33% methanol
  67% water
Heat transfer liquid flow rate: 20.83 ml/minute
Fuel pressure: 260 kPa a. (2.6 bar absolute)
Load: 0.21 amp/cm$^2$ (195 ASF)

Figure 9:
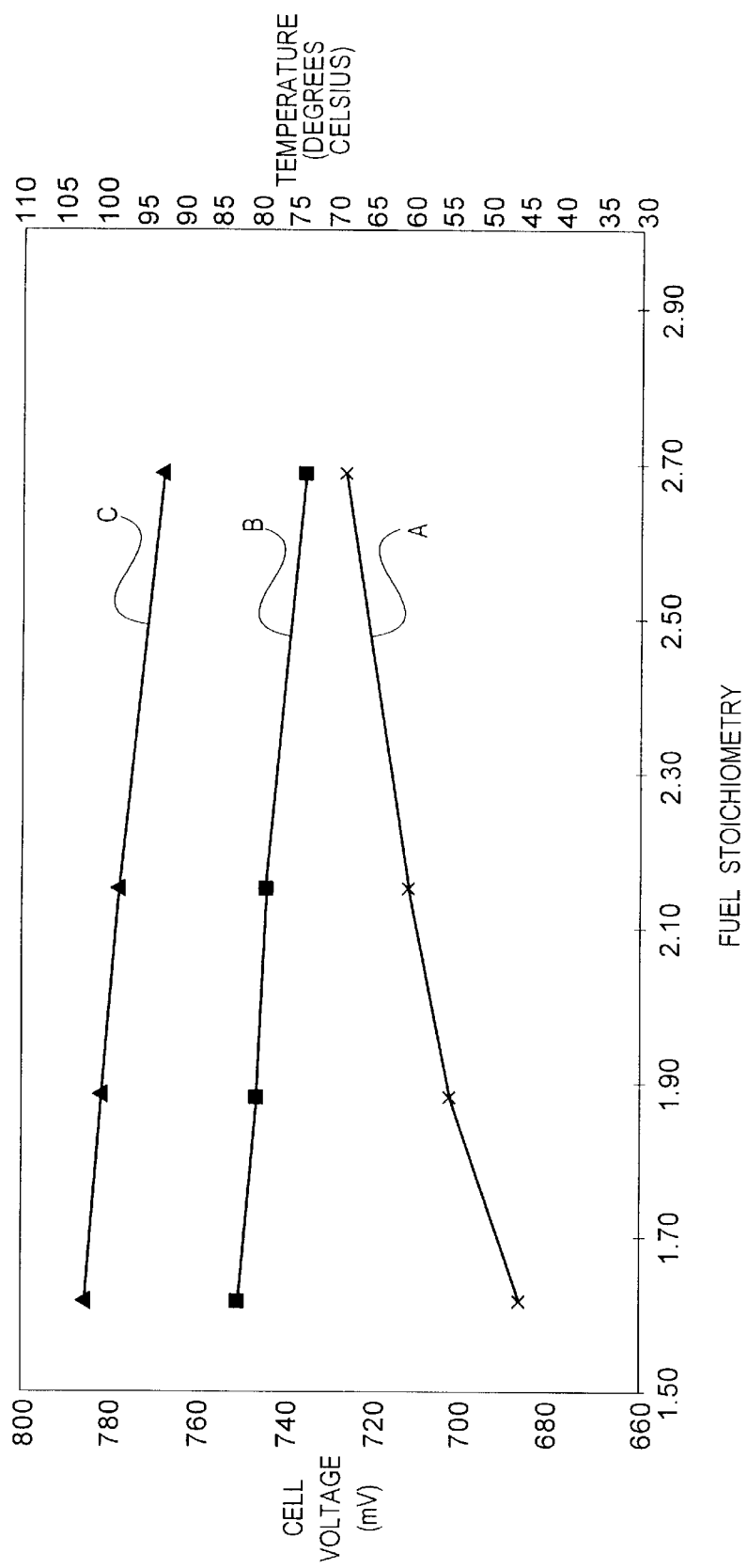
FIG. 9 is a graph which illustrates data obtained from a fuel cell operating on a two-phase fuel stream comprising hydrogen as the principal reactant and methanol as a heat transfer liquid. There are three plots which illustrate cell voltage and the temperature of the fuel cell anode side separator plate, as functions of fuel stoichiometry for a fuel cell employing a two-phase fuel fluid stream comprising gaseous hydrogen and aqueous methanol.

Approximately 1% air was added to the fuel fluid stream supplied to the anode. In this experiment, the fuel fluid stream was not re-circulated. FIG. 9 shows data from this experiment. The x-axis represents the fuel stoichiometry. The left y-axis represents cell voltage in millivolts, and the right y-axis represents temperature in degrees Celsius. Plot A is a plot of average cell voltage versus fuel stoichiometry. Plots B and C are plots of fuel side separator plate temperature versus fuel stoichiometry. Plot B shows the plate temperature measured near the fuel fluid stream inlet and plot C shows the plate temperature measured near the fuel fluid stream outlet. This example shows that, inter alia, the temperature of the fuel cell assembly can be controlled without separate cooling fluid passages by using a heat transfer liquid, such as methanol, which flows in the same fuel cell fluid passages as a gaseous hydrogen fuel stream.

EXAMPLE 2

Figure 10:
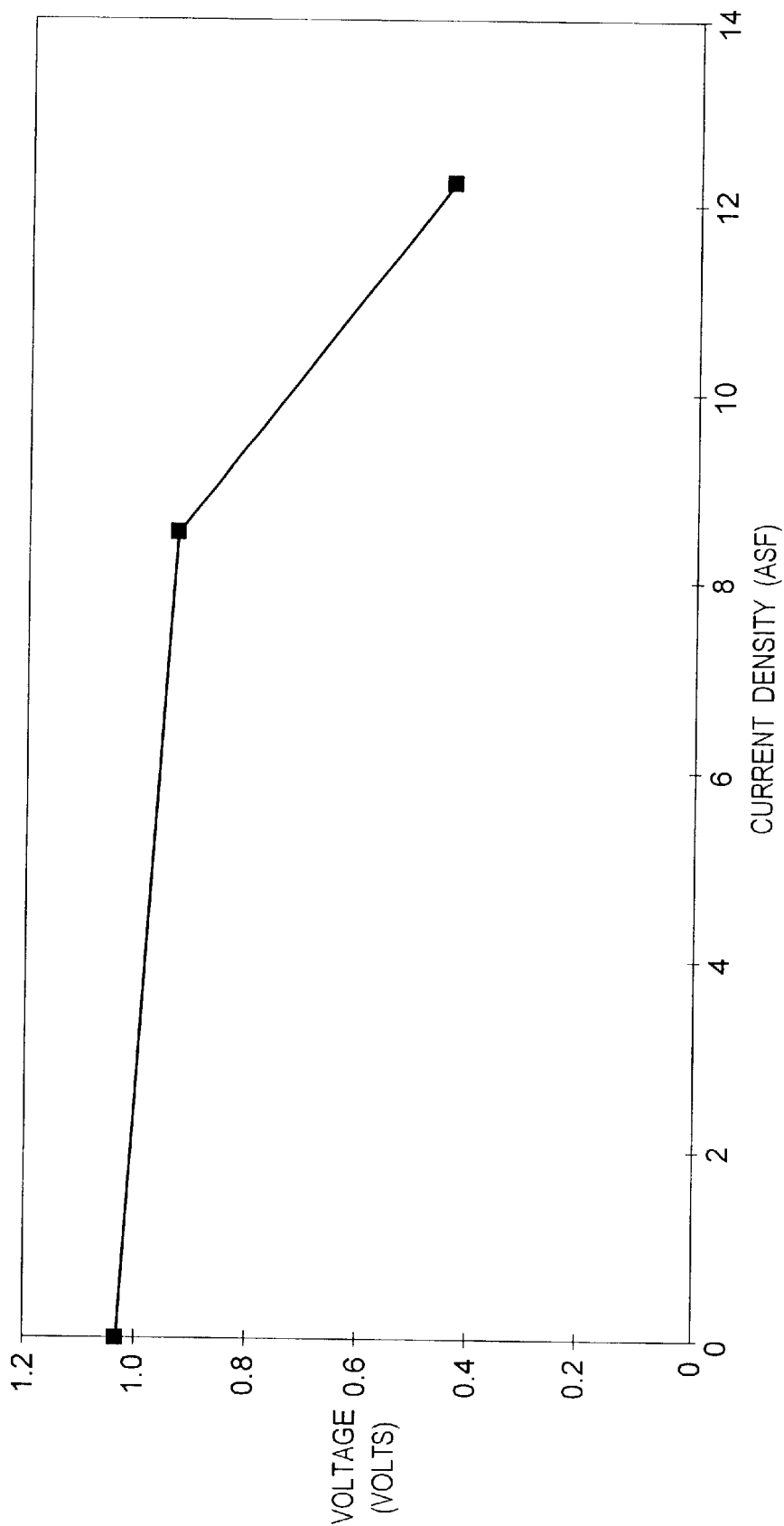
FIG. 10 is a polarization plot showing cell voltage as a function of current density in a fuel cell employing an aprotic heat transfer liquid saturated with oxygen as the oxidant fluid stream.

A fuel cell power generation system similar to the one which is illustrated schematically in FIG. 3 (but with a single fuel cell assembly) was used to saturate a heat transfer liquid comprising perfluorotributylamine with oxygen (approximately 30% oxygen by weight), forming a liquid phase oxidant fluid stream which was introduced to the cathode of an operating fuel cell. The recirculated heat transfer liquid was cooled by flowing it and a chilled water stream through a liquid-liquid heat exchanger. A fuel stream comprising gaseous hydrogen was introduced to the anode. This experiment yielded the data illustrated in the polarization plot of FIG. 10, which shows cell voltage, as a function of current density, in amps per square foot. The fuel cell was approximately isothermal with the temperature controlled at about 50° C. during steady state operating conditions. The saturated oxidant fluid stream flow rate was approximately 2 liters per minute (lpm), under the following operating conditions:

Oxidant fluid stream pressure: 549.5 kPa absolute (65 psig)
Fuel pressure: 549.5 kPa absolute (65 psig)
Fuel stoichiometry: approximately 1.5

This example shows that, inter alia, an effective amount of oxidant can be dissolved in a heat transfer liquid and supplied to a fuel cell cathode to produce power. This example also shows that the temperature of a fuel cell can be controlled by flowing a heat transfer liquid through an oxidant fluid passage and a heat exchanger.

EXAMPLE 3

A fuel cell power generation system similar to the one that is illustrated schematically in FIG. 4 (but with a single fuel cell assembly) was used to introduce to a cathode of an operating Ballard™ Mark 5E fuel cell, a two-phase oxidant fluid stream. The two-phase oxidant fluid stream was formed by injecting a heat transfer liquid into a gaseous oxygen stream. The heat transfer liquid flow rate was approximately 0.1 lpm. In this experiment, the heat transfer liquid was a solution obtained from 3M Company, which 3M Company identifies as FC-77™. The liquid FC-77™ is a proprietary mixture including perfluorooctane and a perfluorocyclic ether. A fuel stream comprising gaseous hydrogen was introduced to the anode. The fuel cell produced a voltage that oscillated between 0.52 and 0.54 volts for a current density of 0.538 amps per square centimeter. This experiment was continued for about an hour with the following operating conditions:

Oxidant fluid stream pressure: 308.2 kPa absolute (30 psig)
Oxidant stoichiometry: approximately 10.0
Fuel pressure: 308.2 kPa absolute (30 psig)
Fuel stoichiometry: 1.5

During this experiment, the temperature of the fuel cell was controlled to maintain a temperature of about 65° C. measured at the oxidant outlet during steady state operating conditions. This example shows that, inter alia, the temperature of a fuel cell assembly can be controlled by injecting a heat transfer liquid into a gaseous oxidant stream to produce a two-phase oxidant stream, which is directed to the fuel cell oxidant fluid passages.

EXAMPLE 4

Figure 11:
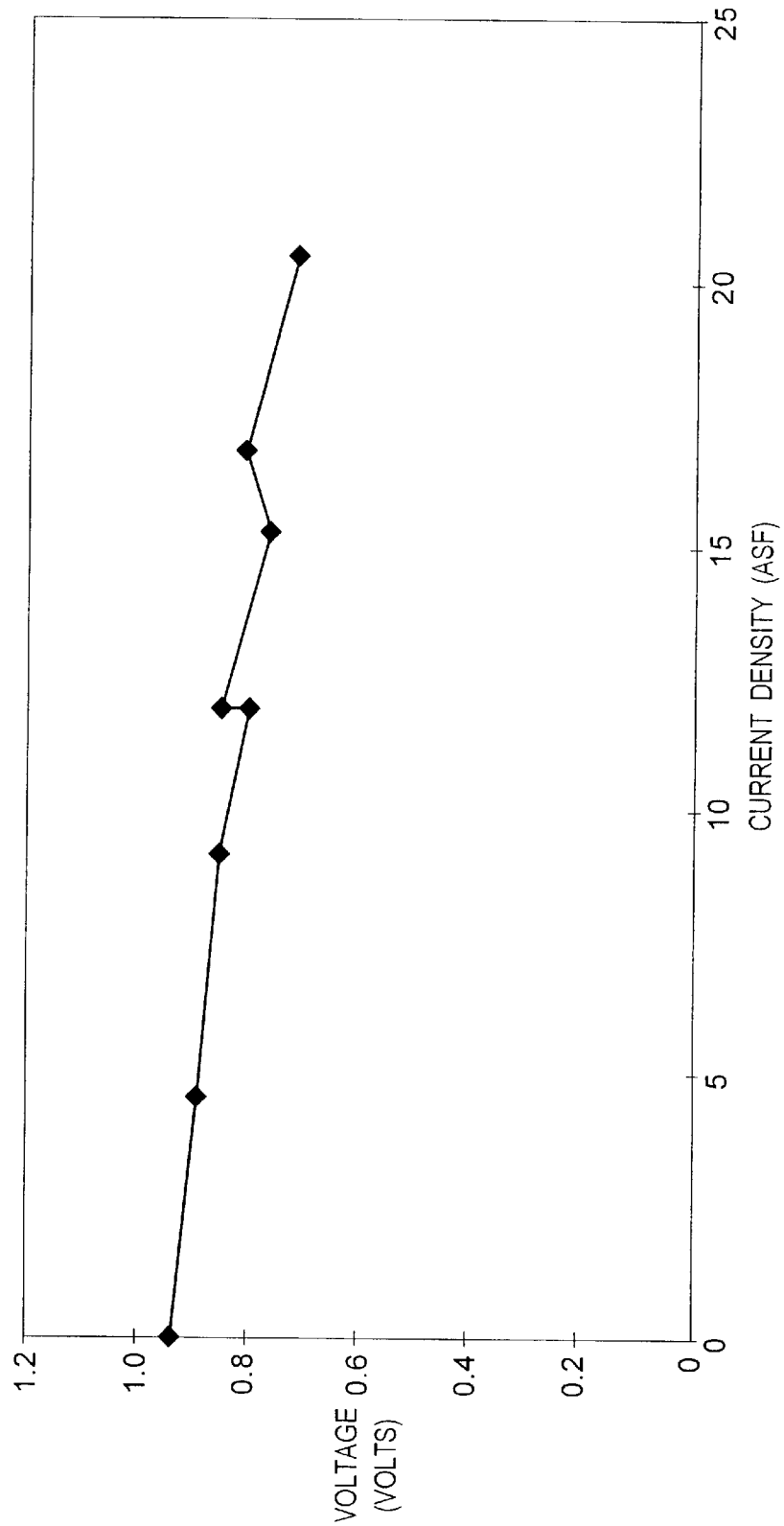
FIG. 11 is a polarization plot showing cell voltage as a function of current density in a fuel cell employing a two-phase oxidant fluid stream comprising gaseous oxygen and an aprotic heat transfer liquid.

A fuel cell power generation system similar to the one that is illustrated schematically in FIG. 4 (but with a single fuel cell assembly) was used to introduce to a cathode of an operating Ballard™ Mark 5E fuel cell, a two-phase oxidant fluid stream. In this example, the two-phase oxidant fluid stream was formed by injecting gaseous oxygen into FC-77™ to saturate the liquid FC-77™ with oxygen. During this experiment, FC-77™ was supplied to the cathode at a flow rate of approximately 2 lpm. The experiment used a fuel cell and data from this experiment was used to graph the polarization plot in FIG. 11, in which the x-axis represents current density measured in amps per square foot, and the y-axis represents voltage measured in volts. The temperature of the fuel cell was controlled in the range of approximately 60° C. to 65° C., measured at the outlet of the oxidant fluid passage, under the following operating conditions:

Oxidant fluid stream pressure: 549.5 kPa absolute (65 psig)
Fuel pressure: 549.5 kPa absolute (65 psig)
Fuel stoichiometry: approximately 1.5

This example shows that, inter alia, the temperature of a fuel cell assembly can be controlled by injecting a gaseous oxidant stream into a heat transfer liquid to produce a two-phase oxidant stream which directs both a gaseous oxidant and a heat transfer liquid to the fuel cell oxidant fluid passages.

EXAMPLE 5

A fuel cell power generation system similar to the one which is illustrated schematically in FIG. 5 (but with a single fuel cell assembly) was used to introduce to an anode of an operating fuel cell, a two-phase fuel fluid stream comprising pure hydrogen gas as reactant and FC-77™ as the heat transfer liquid. In this experiment, the heat transfer liquid was introduced intermittently. Every ten seconds, heat transfer liquid was injected into the fuel fluid stream for 0.25 second with an injection pressure of about 652.9 kPa absolute (80 psig). Air was used for the oxidant fluid stream. Using this arrangement, an average fuel cell voltage of 0.4 was produced at a current density of 0.538 amps per square centimeter, an air stoichiometry of about 2.0 at the cathode, and a fuel stoichiometry of about 3.0 at the anode. During this experiment, the temperature of the fuel cell was controlled to maintain a temperature of about 80° C. during steady state operating conditions. This example shows that, inter alia, a heat transfer liquid can be introduced intermittently into a gaseous fuel to produce a two-phase fuel fluid stream so that heat transfer liquid flows through a fuel cell fuel fluid passage, whereby the temperature of the fuel cell assembly is controlled.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features that come within the scope of the invention.

What is claimed is:

1. A method of controlling temperature within an electrochemical fuel cell, said fuel cell comprising an electrolyte interposed between first and second electrodes and a quantity of electrocatalyst disposed at an interface between said electrolyte and each of said first and second electrodes, said method comprising:
    (a) introducing to said first electrode a reactant fluid stream comprising a gaseous reactant and a non-aqueous heat transfer liquid, such that said reactant fluid stream contacts said first electrode;

(b) removing a reactant fluid exhaust stream from said first electrode, said reactant fluid exhaust stream comprising said heat transfer liquid; and (c) recirculating at least a portion of said heat transfer liquid from said reactant fluid exhaust stream to said first electrode via a heat exchanger, whereby the temperature of said heat transfer liquid is controlled.

2. The method of claim 1 wherein said fuel cell is a solid polymer electrolyte fuel cell.

3. The method of claim 2 wherein said fuel cell is one of a plurality of fuel cells arranged in a stack.

4. The method of claim 3 further comprising dissolving said reactant in said heat transfer liquid to produce said reactant fluid stream.

5. The method of claim 3 wherein said reactant is mixed with said heat transfer liquid inside a reactant stream supply manifold within said stack.

6. The method of claim 2 further comprising the step of mixing said reactant with said heat transfer liquid to produce said reactant fluid stream.

7. The method of claim 1 wherein said reactant fluid stream further comprises water.

8. The method of claim 1 wherein said heat transfer liquid is substantially immiscible with water.

9. The method of claim 1 further comprising monitoring the temperature of said fuel cell and controlling the temperature of said fuel cell to keep the temperature within a pre-set temperature range.

10. The method of claim 1 wherein said reactant fluid exhaust stream further comprises surplus reactant and said method further comprises recirculating at least a portion of said surplus reactant to said first electrode by introducing it into said reactant fluid stream.

11. The method of claim 10 further comprising separating said surplus reactant from said heat transfer liquid in said reactant fluid exhaust stream.

12. The method of claim 1 further comprising controlling the proportion of said reactant and said heat transfer liquid in said reactant fluid stream.

13. The method of claim 1 further comprising pressurizing said reactant fluid stream above atmospheric pressure.

14. The method of claim 1 further comprising using said heat transfer liquid to purge reaction product water and excess hydration water from said fuel cell by introducing said heat transfer liquid to said first electrode.

15. The method of claim 1 wherein said reactant is a gas and said reactant fluid stream is introduced to said first electrode as a two-phase fluid stream.

16. The method of claim 1 wherein said heat transfer liquid is dielectric.

17. The method of claim 1 wherein said heat transfer liquid is aprotic.

18. The method of claim 1 wherein said heat transfer liquid is selected from the group consisting of paraffin oils, fluorocarbons, and hydrocarbons.

19. The method of claim 18 wherein said fluorocarbon is a perfluorocarbon.

20. The method of claim 1 wherein said heat transfer liquid is selected from the group consisting of perfluorooctane, perfluorotributylamine, 1-decene, perfluoroether, perfluorocyclic ether, perfluorotripropylamine, cis-perfluorodecalin, transperfluorodecalin, perfluoro-1-methyl decalin, perfluoroisopentyltetrahydropyrane, perfluoro-N,N-dimethylcyclohexylamine, perfluoroperhydrophenanthrene, perfluorotriamylamine, and perfluorotributylamine.

21. The method of claim 1 wherein said heat transfer liquid is chemically unreactive towards fluids constituting said reactant fluid stream.

22. The method of claim 1 wherein said heat transfer liquid is chemically unreactive towards fuel cell components that directly contact said reactant fluid stream.

23. The method of claim 1 wherein said first electrode is a cathode.

24. The method of claim 1 wherein said reactant fluid stream is an oxidant fluid stream.

25. A method of controlling temperature within an electrochemical fuel cell, said fuel cell comprising an electrolyte interposed between first and second electrodes and a quantity of electrocatalyst disposed at an interface between said electrolyte and each of said first and second electrodes, said method comprising introducing to said first electrode, a two-phase reactant fluid stream comprising a gaseous reactant and a non-aqueous heat transfer liquid, such that said reactant fluid stream contacts said first electrode.

26. The method of claim 25 wherein said heat transfer liquid is substantially immiscible with water.

27. The method of claim 25 wherein said heat transfer liquid is pressurized and mixed with said gaseous reactant by injecting said heat transfer liquid into said gaseous reactant.

28. The method of claim 25 wherein said first electrode is an anode and said gaseous reactant is a gaseous fuel and said two-phase reactant fluid stream is a two-phase fuel fluid stream.

29. The method of claim 28, further comprising introducing to said second electrode, a two-phase oxidant reactant stream comprising a gaseous oxidant and a heat transfer liquid, such that said two-phase oxidant stream contacts said second electrode.

30. The method of claim 28 wherein said gaseous fuel comprises hydrogen and said heat transfer liquid is methanol.

31. An electrochemical fuel cell power generation system comprising:

(a) a plurality of fuel cell assemblies arranged in a stack, each of said fuel cell assemblies comprising:
an electrolyte interposed between a first electrode and a second electrode;
a quantity of electrocatalyst disposed at interfaces between said electrolyte and each of said first electrode and said second electrode;
a first reactant fluid passage adjacent said first electrode having an inlet and an outlet;
a second reactant fluid passage adjacent said second electrode having an inlet and an outlet;

(b) a first reactant supply subsystem comprising a first reactant supply manifold which fluidly connects a first reactant supply to said first reactant fluid passage;

(c) a second reactant supply subsystem comprising a second reactant supply manifold which fluidly connects a second reactant supply to said second reactant fluid passage;

(d) a heat transfer liquid supply subsystem comprising a reservoir which is fluidly connected to said first reactant fluid passage inlet for directing a first reactant fluid stream comprising a first gaseous reactant and a non-aqueous heat transfer liquid into said first reactant fluid passage;

(e) a recirculation subsystem comprising a recirculation fluid passage fluidly connecting said first reactant fluid passage outlet to said first reactant fluid passage inlet; and (f) a heat exchanger disposed in said recirculation passage between said first reactant fluid passage outlet and said first reactant fluid passage outlet for controlling the temperature of said heat transfer liquid.

32. The electrochemical fuel cell power generation system of claim 31 further comprising a mixer for mixing said heat transfer liquid with said first reactant to make said first reactant fluid stream.

33. The electrochemical fuel cell power generation system of claim 32 wherein said mixer, is an injector.

34. The electrochemical fuel cell power generation system of claim 33 wherein said injector has a nozzle aligned with a flow direction of said reactant fluid stream.

35. The electrochemical fuel cell power generation system of claim 33 wherein said injector comprises a nozzle located at each of said first reactant fluid passage inlets.

36. The electrochemical fuel cell power generation system of claim 33 wherein said heat transfer liquid is directed through said injector into said first reactant.

37. The electrochemical fuel cell power generation system of claim 31 further comprising a temperature sensor associated with said plurality of fuel cell assemblies for monitoring the temperature of said plurality of fuel cell assemblies.

38. The electrochemical fuel cell power generation system of claim 37 wherein said temperature sensor monitors the temperature of an exhaust fluid flowing from an outlet of one of said first and second reactant fluid passages.

39. The electrochemical fuel cell power generation system of claim 31 wherein said reservoir is a pressure vessel.

40. The electrochemical fuel cell power generation system of claim 31 wherein said recirculation subsystem further comprises a pump.

41. The electrochemical fuel cell power generation system of claim 31 wherein said recirculation fluid passage directs said heat transfer liquid to said heat transfer liquid reservoir.

42. The electrochemical fuel cell power generation system of claim 31 wherein said recirculation subsystem further comprises a fluid separator for separating at least a portion of said heat transfer liquid from said first reactant exhaust stream, and directing it to said reservoir.

43. The electrochemical fuel cell power generation system of claim 31 wherein said heat exchanger is located between said first reactant fluid passage outlet and said reservoir.

44. The electrochemical fuel cell power generation system of claim 31 wherein said heat transfer liquid supply subsystem is fluidly connected to said second reactant fluid passage inlet and said recirculation subsystem further comprises a second recirculation passage which fluidly connects said second reactant fluid passage outlet to said second reactant fluid passage inlet.

45. The electrochemical fuel cell power generation system of claim 31 wherein said first electrode is a cathode.

* * * * *